United States Patent [19]
Huey et al.

[11] Patent Number: 4,675,039
[45] Date of Patent: Jun. 23, 1987

[54] METHOD AND APPARATUS FOR FORMING GLASS FIBERS

[75] Inventors: Larry J. Huey; Jerome F. Marra, both of Granville, Ohio

[73] Assignee: Owens-Corning Fiberglas Corporation, Toledo, Ohio

[21] Appl. No.: 810,009

[22] Filed: Dec. 17, 1985

[51] Int. Cl.⁴ .............................................. C03B 37/02
[52] U.S. Cl. ............................................... 65/2; 65/1; 65/12
[58] Field of Search .................................... 65/1, 2, 12

[56] References Cited

U.S. PATENT DOCUMENTS 3,012,373 12/1961 Willis ..................................... 65/1 X
3,269,816 8/1966 Helbing ..................................... 65/2
3,294,503 12/1966 Machlan et al. ........................... 65/1
3,985,530 10/1976 Hynd ......................................... 65/1
4,436,541 3/1984 Pellegrin et al. ........................... 65/2
4,488,891 12/1984 Grubka et al. ............................. 65/2
4,553,994 11/1985 Greene et al. ............................. 65/2

Primary Examiner—Robert Lindsay
Attorney, Agent, or Firm—Ronald C. Hudgens; Greg Dziegielewski; Ronald E. Champion

[57] ABSTRACT

A feeder system for the production of glass filaments is provided with a shallow layer of molten glass over the discharge wall in combination with a flow control means adapted to regulate the depth of the layer to provide dripless and non-dripless operation as desired. Preferably, the feeder is rendered non-dripless when the restart of filament formation from the idled orifices is desired.

7 Claims, 2 Drawing Figures

METHOD AND APPARATUS FOR FORMING GLASS FIBERS

TECHNICAL FIELD

The invention disclosed herein relates to the prpduction of glass fibers wherein process interruptions from bead drops and flooding are reduced while providing improved restartability.

BACKGROUND OF THE INVENTION

In the production of glass filaments, it is convention to flow streams of molten glass from closely spaced orifices in the bottom or discharge wall of an electrically heated, precious metal alloy feeder or bushing.

For the production of continuous glass filaments, there are two general types of feeders available. The more widely used type employs a bottom wall having stream defining orifices provided in projections or tips, depending from the exterior surface of the bottom wall. The second, a more recently developed type, employs an orificed bottom wall having a planar exterior surface. The first type is known as a "tipped" feeder; for example, see U.S. Pat. Nos. 4,222,757 and 4,321,074. The second type of feeder is known as a "tipless" feeder; for example, see U.S. Pat. No. 3,905,790.

Historically, glass fiber forming operations have been plagued by primarily two phenomena occuring after a filament break—flooding and bead drops.

Recently, a glass fiber forming system has been developed that dramatically reduces the effects of disruptive filament breaks. U.S. Pat. No. 4,488,891, issued to Grubka et al, discloses a fiber forming system otherwise known as "dripless". That is, during operation if a filament breaks, the glass will cease to flow from the orifice associated with the break while attenuation is maintained from the remaining orifices. Thus, the glass does not drip from the orifice of the severed filament.

The advantages of such a system are clear. One of the disadvantages is increased "restart" times, as compared to conventional feeders, when the number of filament breaks ultimately requires the restart of the attenuation process at the disrupted/idled orifices.

SUMMARY OF THE INVENTION

This invention provides, in part, the decreased sensitivity to filament breaks provided by the "dripless" types of feeders while also providing, in part, the ease of "restartability" provided by the heretofore "conventional" or "non-dripless" types of feeders.

This is accomplished by establishing a shallow layer of molten glass over an orificed discharge wall to provide the streams of molten glass for attenuation into filaments, the layer being maintained at a first level or depth to establish "dripless" operation during production and briefly increasing the flow of molten glass into the layer to increase the layer to a second level or depth to establish "non-driplesss" operation to facilitate the restart of filament formation as desired.

BEST MODE OF CARRYING OUT THE INVENTION

Figure 1:
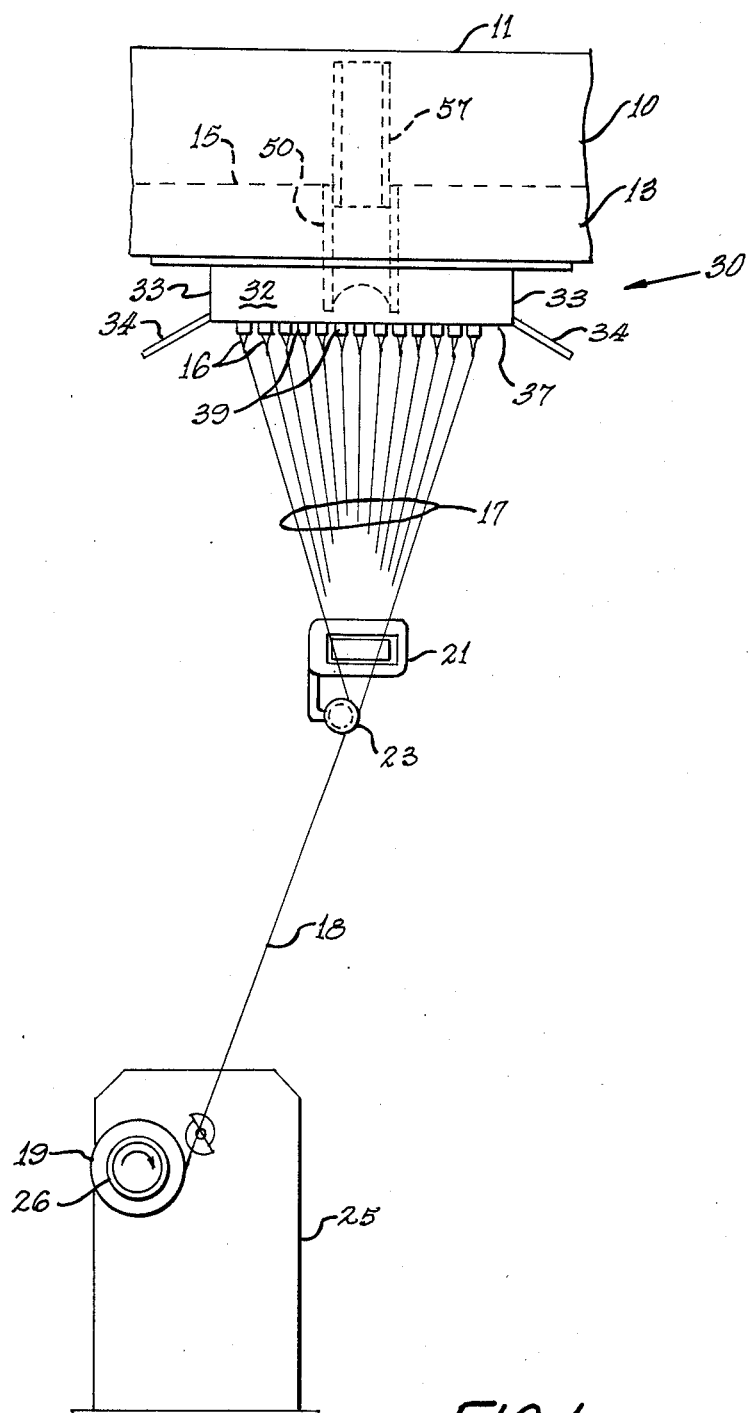
FIG. 1 is a schematic front elevational view of a glass fiber forming operation.

As shown in FIG. 1, conically shaped streams of molten glass 16, otherwise known as forming cones issuing from feeder 30, are atenuated into a plurality of filaments 17 through the action of attenuation means or winder 25. The newly formed filaments 17 receive a protective coating or sizing from coating applicator 21 as is known in the art. The coated filaments 17 are then gathered into a strand 18 at gathering means 23, which is collected as a helically wound package 19 on collet 26 or winder 25.

As such, the filaments formed are continuous filaments. However, it is to be understood that feeders employing the principles of the present invention are also readily applicable to the formation of discontinuous filaments and/or association with other attenuation means. Further, such feeders may be employed in the fiberization of other inorganic materials.

For the purposes of clarity, no cooling system for cooling the forming region and the newly formed glass fibers is shown. However, it is to be understood that any suitable cooling system, such a finshields and/or convective air cooling, may be employed.

As shown in FIG. 1, feeder 30 is positioned in the refractory of channel 13 which carries the body or pool of molten glass 10 to feeder 30 from a furnace (not shown).

As will be explained in more detail later herein, the head of the body of molten glass 10, that is, the depth of the glass from top surface 11 to bottom wall 15 of channel 13, preferably remains substantially constant with the present invention providing adjustable control of the depth or level, and thus head pressure, of a separate layer of molten glass 42 at the discharge wall 37.

Figure 2:
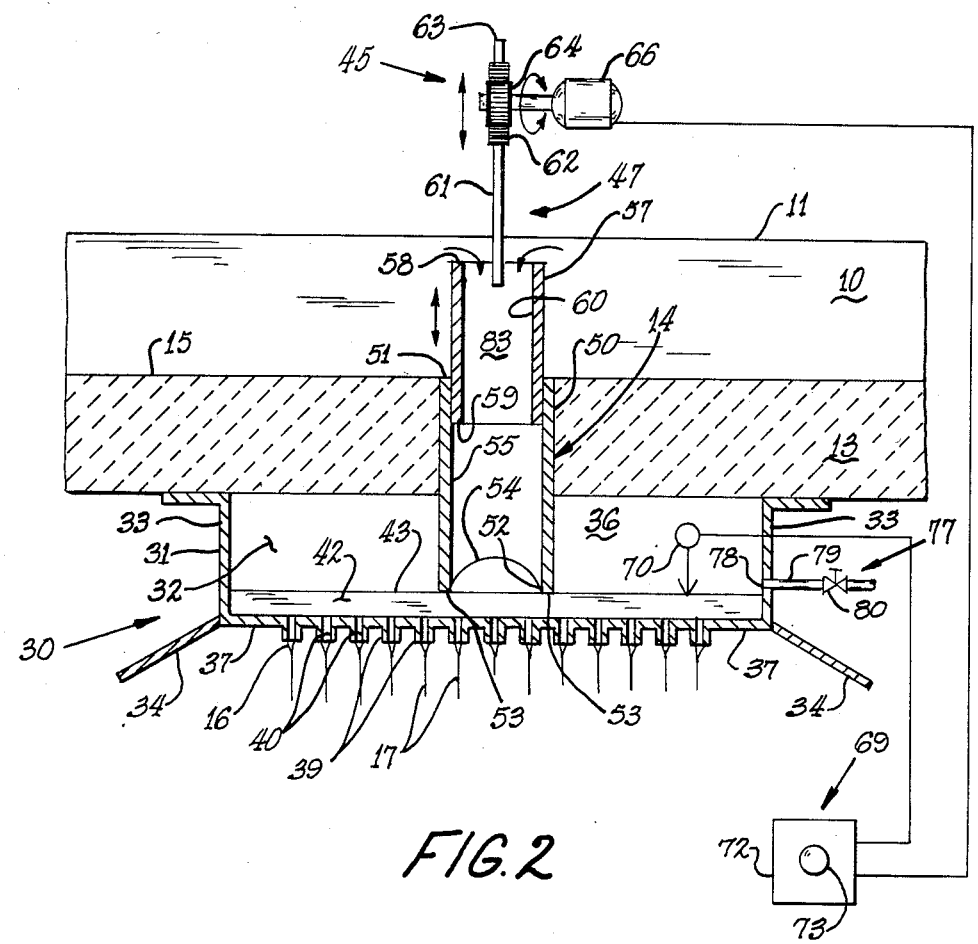
FIG. 2 is an enlarged cross-sectional view of the feeder system shown in FIG. 1

As shown in FIG. 1 and 2, feeder means 30 is, in part comprised of sidewalls 32, endwalls 33 and a discharge wall 37 forming a container 31 to retain the layer of molten glass 42 therein. As is known in the art, a pair of terminals or ears 34 are suitably attached to endwalls 33 (or discharge wall 37). Ears 34 are adapted to be connected to a suitable source of electrical energy (not shown) to provide electrical resistance heating of container 31. Discharge wall 37 includes a plurality of projections 39 depending therefrom. Each projection 39 has at least one orifice 40 adapted to pemit the molten glass to issue therefrom as a stream 16. It is to be understood that the present invention is readily employed with "tipless" feeders also.

According to the principles of this invention, feeder means 30 is designed to provide dripless and non-dripless operating characteristics when desired. Specifically, feeder 30 is rendered non-dripless when the restart of filament attenuation is desired from idled orifices, that is, orifices at which filament attenuation has been disrupted.

With regard to "dripless" operation, aforementioned U.S. Pat. No. 4,488,891, which is hereby entirely incorporated herein by reference, describes in detail the parameters for producing "dripless" operation. Dripless operation is established, according to the principles of this invention, by providing a layer of molten glass over the discharge wall such that the pressure of the molten glass at the orifices is less than the internal pressure of a bead formed at an orifice upon the cessation of filament attenuation at that orifice but greater than the internal pressure of the forming cones during attenuation. As such, the pressure of the molten glass at the discharge plate orifices prevents bead growth and drop from the orifices whereby the flow of molten glass from the disrupted orifices ceases. In other words, for "dripless" operation, the pressure of the molten glass at the orifices of the discharge wall is (1) less than the internal pressure of the bead formed at a given orifice upon breakout at that orifice while the remainder of the orifices operate normally to produce filaments, and (2) greater than the internal pressure of the cones established during steady state attenuation.

Conveniently, the appropriate "dripless" pressure is created by establishing and maintaining a layer of molten glass over an orificed discharge wall at a first depth effective to establish the foregoing pressure parameters for dripless operation while providing the streams of molten glass for attenuation into filaments, the top surface of the layer being preferably exposed to atmospheric pressure.

Desirably, the first depth or level of layer of glass 42 during filament production/attenuation is provided or established such that the pressure at the exit ends of the orifices 40 of the discharge wall 37 preferably is substantially atmospheric for dripless operation. As such, upon a filament break at one of the orifices, the flow of molten glass from that orifice stops yet the pressure is sufficient for maintenance of fiber formation at the remaining orifices, hence "dripless."

As employed herein, "non-dripless" refers to the characteristic of the feeder system wherein molten glass begins to flow or continues to flow from an orifice 40 to form a dripable bead or flow randomly over the face of the discharge wall 37 if no filament is being drawn at that orifice. As such, the pressure of the molten glass at the orifices 40 of discharge wall 37 is greater than the internal pressure of a bead formed at one of such orifices. This facilitates or permits the initiation or restart of filament production from the orifices. Conveniently, "non-dripless pressure" is created at the orifices by increasing the volume of molten glass in the layer to raise the level thereof to a second depth or level greater than the first level to establish a head pressure at the orifices according to the foregoing "non-dripless" pressure parameters.

Once glass flow and attenuation are restarted, the layer of glass is returned to the "dripless" first level or depth.

As shown, container 31 abuts the refractory of channel 13 at well 14. According to the principles of this invention, glass level control system 45 is adapted to control the level or depth of the layer of glass 42 in cavity 36 of container 31. Control system 45 is comprised of a glass flow control means 47 and glass level sensing system 69.

Flow control means 47 is comprised of a first tubular member 50 fixed to channel 13 at well 14 and a second movable tubular member 57 adapted for sliding engagement with first member 50. The position of movable member 57 with respect to the top surface 11 of body of molten glass 10 regulates the rate of flow of the molten glass from body 10 over first or upper end 58 of the movable member 57. After passing over upper end 58, the molten glass proceeds along the interior wall 60 of movable member 57. The molten glass then passes from the lower or second end 59 of movable member 57 to the interior wall 55 of first tubular member 50 and ultimately flows into layer 42 over discharge wall 37.

To provide a smooth flow path into layer 42, distal end 52 of first member 50 has an articulated or scalloped shape having leg sections 53 extending beneath the top surface 43 of the layer of molten glass 42. The arched sections 54 of first member 50 are recessed sufficient such that cavity 36 of container 31 is in communication with the cavity or passageway 83 within tubular members 50 and 57 even when the level of the molten glass layer 42 is raised to its second or "non-dripless" level. As shown, passageway 83 is exposed to the atmosphere above body of molten glass 10 which in turn renders the pressure within cavity 36 substantially atmospheric for dripless as well as non-dripless operation.

The fit between fixed member 50 and movable member 57 permits the location of movable member 57 to be varied to control the flow of molten glass over upper end 58, but is yet snug enough to prevent any substantial flow of molten glalss between first member 50 and second member 57. As shown, the first end 51 of fixed tubular member 50 is shown substantially level with the bottom wall 15 of channel 13. It is to be understood that other positions for end 51 are acceptable provided that the proper fit or clearance between first member 50 and second member 57 is maintained.

The position or height of movable member 57 can be varied by any suitable means. As shown, a shaft 61, which is rigidly secured to movable member 57, extends upwardly and has a gear rack 62 located at upper end 63 of shaft 61. Rack 62 engages pinion gear 64 suitably mounted on motor 66 which, when activated, raises or lowers movable member 57 via shaft 61.

It is to be understood that the depth of the layer of molten glass 42 may be controlled by positioning movable member 57 in response to a visual inspection of layer 42 through tubular members 50 and 57 or through a viewing port located, for example, in the side wall or end wall of container 31. Desirably, however, the depth of layer of molten glass 42 is automatically controlled or regulated by coupling a glass level sensing system 69 with flow control means 47.

Glass level sensing system 69 is comprised of a glass level sensor 70 located within cavity 36 of container 31 and a controller 72 which is adapted to receive the signal from sensor 70 and, preferably incrementally, raise. or lower movable member 57 via motor 66 to control the rate of flow of molten glass over movable member 57 and ultimately into layer 42. Thus, flow control means 47 is varied in response to the output signal from sensor 70.

In operation, switch 73 of controller 72 is set for dripless operation and, accordingly, the glass level control system 45 maintains the level of molten glass layer 42 at its first level or depth effective to establish dripless operation. After a significant number of filaments have broken, and thus, idling their associated orifices, the restart of such orifices is readily accomplished by moving switch 73 to the non-dripless mode which in turn activates motor 66 to lower movable member 57 to permit more molten glass to flow through passageway 83 into layer 42, thus, raising the level of molten glass 42 to its second predetermined level or depth to effect non-dripless operation. Once the flow of glass through orifices 40 and attenuation of filaments therefrom restarted, switch 73 is returned to its "dripless" position to raise movable member 57 to reduce the flow of molten glass into layer 42.

Since the level of molten glass 42 is at its second or non-dripless depth, the volume of molten glass comprising layer 42 must be reduced to return the level of molten glass layer 42 to its first or dripless depth. This can be accomplished by (1) raising movable member 57 such that upper end 58 is above its production/dripless position to reduce or even stop the flow of molten glass over end 58, or (2) draining the excess molten glass from layer 42 via a drain system. By raising member 57 to throttle down the influx of molten glass, the volume of molten glass comprising layer 42 will be reduced, as the molten glass issues from orifices 40 thereby lowering or decreasisng the molten glass to its desired first level or depth. Upon reaching the desired first level, second member 57 is lowered to its first or production zone, thereby returning the flow of molten glass over upper end 58 to the desired production flow rate, which may be automatically accomplished through glass level control system 45. That is, upon returning switch 73 of controller 72 into the dripless position, sensor 70 senses that the glass level 42 is above the desired first level whereupon sensor 70 activates motor 66 to raise movable member 57 accordingly. Upon sensing the molten glass layer 42 at the desired first level or depth, motor 66 is activated to position movable member 57 at its desired production position or set point.

Alternatively, a drain system 77 may be incorporated in the forming to drain the excess molten glass from cavity 36 once restart has been completed. Drain system 77, which may be manually operated or integrated into the automatic glass level control system 45, is comprised of a conduit 79 in communication with port 78 in end wall 33 of container 31. Obviously, port 78 should be located beneath the top of surface 43 of layer 42 for the most effective removal of excess molten glass from layer 42. The movement of molten glass through port 78 and conduit 79 is controlled by any suitable means such as valve 80. Accordingly, to reestablish the dripless mode after restart has been completed under the non-dripless mode, the molten glass of layer 42 is quickly lowered from the second (non-dripless) level to the first (dripless) level by draining off some of the molten glass therein by activating drain system 77. Upon reaching the desired first level, drain system 77 is merely deactivated to cease the supplementary draining of molten glass from layer 42.

As shown herein, flow control means 47 functions as a weir type flow regulator, It is to be understood, however, that any suitable glass flow regulator system adapted to control the flow of molten glass from a supply body into layer 42 to control the depth of layer 42 according to the principles of this invention, is within the scope of the present invention. The weir type flow control system is shown for purposes of illustration. For example, other flow restrictor arrangements are set forth in concurrently filed U.S. patent application Ser. Nos. 809,998, filed in the names of Neil E. Greene, Lawrence J. Grubka and Randall E. Nyhart, and 809,961, filed in the names of Jerome F. Marra and William M. Babbitt, which are hereby incorporated by reference in their entirety, may be adapted to this system to perform according to the principles of this invention.

It is apparent that, within the scope of the present invention, modifications and different arrangements can be made other than as herein disclosed. The present disclosure is merely illustrative with the invention comprehending all variations thereof.

INDUSTRIAL APPLICABILITY

The invention described herein is readily applicable to the glass fiber industry.

We claim:

1. A method of forming inorganic filaments comprising:
   (a) establishing a layer of molten inorganic material along an orifice discharge wall to provide streams of molten material for attenuation into filaments;
   (b) supplying molten glass to the layer at a predetermined production flow rate to maintain the depth of the layer substantially at a first level to establish dripless operation;
   (c) increasing the depth of the layer to a second level to establish non-dripless operation to facilitate restart of filament formation as desired; and then
   (d) decreasing the flow rate of the molten glass into the layer to a predetermined restart flow rate, said restart flow rate being less than the production flow rate to permit the depth of the layer of molten glass to decrease to said first level; and then returning to step "b".

2. The method of claim 1 wherein step "b" is effected by sensing the level of the molten glass layer and controlling the flow of molten glass into said layer in response to said sensing.

3. The method of claim 2 wherein the top surface of the layer is exposed to substantially atmospheric pressure.

4. The method of claim 3 wherein the top surface of the layer is exposed to air.

5. The method of claim 1 wherein steps "b" and "c" are effected by providing a tubular moveable member between said layer at the discharge wall and a supply body of molten glass spaced therefrom, said movable tubular member being variably positioned in a vertical manner to control the flow of molten glass from said body into said layer.

6. Apparatus for the production of glass filaments comprising:
   container means having a cavity therein adapted to contain molten glass, said container having an orifice discharge wall adapted to provide streams of molten glass for attenuation into filaments;
   means for sensing the level of the layer of molten glass
   a tubular member having a first end located near the surface of a body of molten glass in contact with said tubular member, said tubular member being variably positioned to regulate the flow of molten glass from the body over said first end into said layer of molten glass at said discharge wall in response to said sensing, (a) to partially fill the cavity with a layer of molten glass to a first depth to establish dripless operation and (b) to increase the depth of the layer to a second level to establish non-dripless operation to facilitate restart as desired.

7. Apparatus for the production of glass filaments comprising:
   container means having a cavity therein adapted to contain molten glass, said container having an orifice discharge wall adapted too provide streams of molten glass for attenuation into filaments; and
   control means for controlling the flow of molten glass into said layer (a) to partially fill the cavity with a layer of molten glass to a first depth to establish dripless operation and (b) to increase the depth of the layer to a second level to establish non-dripless operation to facilitate restart as desired, said control means being adapted to restrict the flow of molten glass into the layer to reduce the depth of the layer to said first level to reestablish dripless operation subsequent to said non-dripless operation.

* * * * *